US012803667B2

(12) United States Patent
Closs

(10) Patent No.: US 12,803,667 B2
(45) Date of Patent: Nov. 17, 2026

(54) CONFIGURABLE BEACON FOR THE ACQUISITION OF COVERT OPTICAL COMMUNICATION LINKS

(71) Applicant: AIRBUS DEFENCE AND SPACE GMBH, Taufkirchen (DE)

(72) Inventor: Martin Closs, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 234 days.

(21) Appl. No.: 18/715,961

(22) PCT Filed: Dec. 9, 2022

(86) PCT No.: PCT/EP2022/085091
§ 371 (c)(1),
(2) Date: Jun. 3, 2024

(87) PCT Pub. No.: WO2023/110652
PCT Pub. Date: Jun. 22, 2023

(65) Prior Publication Data

US 2025/0047381 A1 Feb. 6, 2025

(30) Foreign Application Priority Data

Dec. 14, 2021 (EP) .................................... 21214450

(51) Int. Cl.
*H04B 10/118* (2013.01)
*H01Q 15/02* (2006.01)

(52) U.S. Cl.
CPC ........... *H04B 10/118* (2013.01); *H01Q 15/02* (2013.01)

(58) Field of Classification Search
None
See application file for complete search history.

(56) References Cited

U.S. PATENT DOCUMENTS 10,963,734 B1 * 3/2021 Wang ........................ G06T 7/74
2008/0186553 A1 * 8/2008 Stenton ................ G02B 26/108 359/837

(Continued)

FOREIGN PATENT DOCUMENTS

| | | |
|---|---|---|
| WO | 2009134290 | 11/2009 |
| WO | 2018134618 | 7/2018 |
| WO | 2019040484 | 2/2019 |

OTHER PUBLICATIONS

European Patent Office, International Search Report and Written Opinion for International Patent Application No. PCT/EP2022/085091, Mar. 16, 2023.

(Continued)

*Primary Examiner* — Darren E Wolf
(74) *Attorney, Agent, or Firm* — Williams Mullen; Thomas F. Bergert

(57) ABSTRACT

In general, the present invention relates to a configurable light signal. More particularly, the present invention relates to an apparatus for providing a configurable light signal, to a moving object comprising such an apparatus and to a method for providing a configurable light signal. An embodiment of the apparatus comprises at least one light source 110, a spatial light modulator 120, a lens system 130, and a controller device 122. The at least one light source 110, the spatial light modulator 120 and the lens system 130 are configured and arranged to provide a light trajectory beginning from the at least one light source 110 to the spatial light modulator 120 into the lens system 130 and out of the lens system 130 to a search field 140. The controller device 122 is configured to control the spatial light modulator 120 and the spatial light modulator 120 is configured to modulate the (Continued)

light of the light trajectory spatially to provide at least one contour limited footprint 141 of the light within the search field 140.

14 Claims, 7 Drawing Sheets

(56) References Cited

U.S. PATENT DOCUMENTS

| | | | | |
|---|---|---|---|---|
| 2014/0379588 | A1* | 12/2014 | Gates | G06T 7/0008<br>705/308 |
| 2018/0038576 | A1 | 2/2018 | Mao | |
| 2019/0353759 | A1* | 11/2019 | Christmas | G01S 7/4817 |
| 2020/0041609 | A1* | 2/2020 | Ames | H04B 10/1143 |
| 2020/0150418 | A1* | 5/2020 | Satoh | G01S 7/4816 |
| 2021/0044748 | A1* | 2/2021 | Hu | G02B 1/002 |
| 2023/0037235 | A1* | 2/2023 | Roberts | G01S 7/499 |
| 2023/0113310 | A1* | 4/2023 | Nadler | H04N 23/81<br>348/169 |

OTHER PUBLICATIONS

European Patent Office, Extended European Search Report for International Patent Application No. EP 21 21 4450.5, Jun. 14, 2022.

* cited by examiner

CONFIGURABLE BEACON FOR THE ACQUISITION OF COVERT OPTICAL COMMUNICATION LINKS

CROSS-REFERENCE TO RELATED APPLICATIONS

This application is the U.S. national phase application of international patent application PCT/EP2022/085091 filed on Dec. 9, 2022 and claims the benefit of European patent application No. 21 21 4450.5 filed on Dec. 14, 2021, the entire disclosures of which are incorporated herein by way of reference.

In general, the present invention relates to a configurable light signal. More particularly, the present invention relates to an apparatus for providing a configurable light signal, to a moving or/and static object comprising such an apparatus and to a method for providing a configurable light signal.

Light signals may be specifically designed for a given purpose. For instance, beacon lights or beacon signals on aircrafts, vessels or satellites indicate the relative position and/or direction of movement to other participants and therefore contribute to a saver traffic environment. Such light signals are not designed for providing inter-aircraft, inter-vessel or inter-satellite communication.

The general process to establish an optical communications link with optical means only uses a light beacon (or, in short, just beacon) that is sent out by one of two communication partners (named partner “A” or just “A” in the following). The other partner (named partner “B” or just “B” in the following) can then passively detect the beacon, without the need to transmit a beacon of their own. Once the beacon of A has been detected, B can use it to precisely point its communication beam towards A. A can now detect the communication beam sent out by B and use this to precisely point its communications beam towards B. By this, the communications link is established and the beacon can be turned off.

Usually, the beacon itself is still quite narrow, only covering the open-loop pointing inaccuracy of A. Optical communication links are very hard to intercept or detect by third parties because the laser beam used to transfer data between communication partners is very narrow. This however imposes a dilemma when the optical link shall be established at the beginning of a communications phase: As the beam is so narrow, it must be pointed accurately towards the communication partner. This requires good knowledge of the partner’s location, which is usually transmitted via a radio link. In situations where at least one communication partner wishes to remain undetected, transmitting your own location via radio is not desired. That is, such a narrow beacon will however not work if the position of B is not yet known.

As a consequence, this approach has the problem that the exact location of B has to be known. There is a need for a radio transmission to identify each other’s location. This transmission can be intercepted.

An alternative to the process described above would use an omnidirectional light source as a beacon, similar to the position lights of an aircraft. Communication partner B would operate a set of cameras that cover all directions and thus detect A’s “position light”. With this concept, B can remain entirely passive until the optical link is established and no position information needs to be exchanged. However, as long as the “position light” is on, A can be easily detected by a third party. Furthermore, B’s detection system would detect every light source that is strong enough and is thus easily jammed. The omnidirectional source can thus be easily intercepted by others.

Thus, there is a need for an improved technique for providing a light signal, e.g. a beacon signal.

According to a first aspect, an apparatus for providing a configurable light signal is provided. The apparatus comprises at least one light source, a spatial light modulator, a lens system and a controller device. The at least one light source, the spatial light modulator and the lens system are configured and arranged to provide a light trajectory. The light trajectory starts or begins at the at least one light source and continues to the spatial light modulator, into the lens system and out of the lens system to a search field. The controller device is configured to control the spatial light modulator. The spatial light modulator is configured to modulate light of the light trajectory spatially. In this way, the apparatus and, more particularly, the spatial light modulator provides at least on contour limited footprint of the light of the light trajectory within the search field.

The spatial light modulator may thus be configured to modulate, under control of the controller device, light of the light trajectory spatially to provide at least one contour limited footprint of the light of the light trajectory within the search field. In other words, the controller device may be configured to control the spatial light modulator such that the spatial modulator modulates light of the light trajectory spatially to provide at least one contour limited footprint of the light of the light trajectory within the search field.

The contour limited footprint may be an area or region or spot or section within the search field that is illuminated by the light. This has the advantage that the apparatus can illuminate at least one certain area (i.e. the contour limited footprint) within the search field. Thereby at least one participant or communication partner can be addressed individually.

The light signal may be a beacon signal or, in short, a beacon. Thus, the configurable light signal may be a configurable beacon signal or a configurable beacon. A beacon may be an intentionally conspicuous device designed to attract attention to a specific location. The beacon signal may be the light signal provided by the device.

A search field may be considered to correspond to a/the field of view of a lens system. For example, the search field may be considered to correspond to the field of view of the lens system of the apparatus according to the first aspect. The search field may describe an imaginary dome at/onto which light can be projected. The angular extend of the dome may be determined by the field of view of the lens system.

A contour may be regarded as an outermost boundary line that encloses a footprint. A contour limited footprint may thus be considered a projected or illuminated area at or on the search field. The contour limited footprint may usually be smaller than the search field but can be extended to or even match the search field.

Modulating light may include or be redirecting light and/or changing direction of light and/or changing direction of light by refraction and/or by phase shifting light and/or reflecting light.

The at least one light source may be configured to provide light. The at least one light source and the spatial light modulator may be arranged relative to one another such that light provided by the at least one light source is incident on the spatial light modulator. The spatial light modulator may be configured to modulate, e.g. redirect and/or reflect and/or change direction, of the incident light provided by the at least one light source. At least a part or portion of the modulated, e.g. redirected light, may be directed from the spatial light modulator to the lens system. The lens system may guide the light depending on the optical properties of the lens system. The lens system may be configured to direct onto or to a search field. In this way, the lens system may illuminate a portion or section or area or spot of the search field. The contour limited footprint may thus be formed on or at or in the search field.

As mentioned above, the light signal may be a beacon signal or, in short, a beacon. The apparatus according to the first aspect may thus provide a configurable beacon signal or beacon. The direction and/or shape of the beacon (signal) can be freely chosen, to only cover directions where a communication partner is assumed to be and exclude all other directions. During a mission, the approximate direction to the communication partner may be known by the object having or carrying the apparatus according to the first aspect, even if the exact position is unknown. For instance, the object having or carrying the apparatus could know that the communication is somewhere in the southwest, e.g. flying above the object having or carrying the apparatus. The apparatus then allows illuminating only areas in the southwest above the object carrying the apparatus and excluding all other directions. In addition, the beacon (signal) can be modulated to transmit encrypted information as will be explained in more detail below. This allows secure identification and authentication of the communication partner(s), which avoids that the communication partner(s) is/are jammed.

The exact location of the communication partner does not need to be known to the apparatus or the object having or carrying the apparatus. At the same time the beacon provided by the apparatus can be limited to only the directions where the communication partner is assumed to be. This reduces the probability that the apparatus or the object having or carrying the apparatus can be detected by a third party.

It also eliminates the need for a radio transmission to identify each other's location. An optical link can therefore be established entirely under radio silence. The communication partner can remain entirely passive up to the point where the optical communication link is established. Detecting the communication partner through its communication system is therefore nearly impossible. The modulation of the beacon ensures proper authentication and authorization and avoids jamming and/or spoofing.

Thus, by way of the apparatus, interaction between communication partners is reduced to a minimum and it is kept entirely in the optical domain in order to avoid radio transmission. The security of the communication is thus significantly increased.

The controller device may be configured to control the spatial light modulator based on a direction and/or a location and/or a position of a communication partner. The direction may be an approximate direction. The direction does not have to be a precise direction. The location/position may be an approximate location/position. The location/position does not have to be a precise location/position. The direction and/or location and/or position may be information that is not transmitted from a communication partner but known to the object having or carrying the apparatus or known to the apparatus.

The spatial light modulator may be configured to modulate the light of the light trajectory spatially in such a way that at least one contour limited footprint can be steerable or changeable or the contour of the contour limited footprint can be shapeable within the search field. This is advantageous if a contour or shape of a contour limited footprint on the search field should be adjustable. Further, this is advantageous if several areas on the search field have to be illuminated differently. In this way, participants or communication partners can be addressed differently. For example, one or more participants or communication partners can be addressed or illuminated whereas others are not or are addressed or illuminated differently. Further, participants or communication partners within the contour limited footprint (s) can be dynamically addressed or illuminated.

The spatial light modulator may be configured to manipulate, e.g. modulate, at least one of a phase and an amplitude of the incoming light of the light trajectory. The incoming light may be the light of the light trajectory that is directed to the spatial light modulator. The incoming light may be light provided by the at least one light source e.g. in the direction of the spatial light modulator. In this way, the spatial light modulator may be configured to provide information to an area within the contour limited footprint. This area may be referred to as contour limited information footprint. In this way, a contour limited information footprint may be formed. A contour limited information footprint may be at least one area within the contour limited footprint that may experience or carry information. The area of the contour limited information footprint may usually be smaller than the contour limited footprint but can be as extended or even match the contour limited footprint.

Alternatively or additionally to manipulating at least one of the phase and the amplitude of the incoming light of the light trajectory, at least one of the at least one light source may be configured to manipulate, e.g. modulate, the phase or the amplitude of the light generated by the at least one light source. One of the at least one light source may be configured to manipulate, e.g. modulate, the light externally or internally. The spatial light modulator may be configured to modulate the light of the light trajectory spatially. In this way, at least one contour limited footprint may be formed within the search field. The light provided by the at least one light source may be modulated internally or externally. In this way, the at least one modulated light source may provide information to at least one of the contour limited footprint.

In this way, another at least contour limited information footprint may be formed within the at least one contour limited footprint. The contour limited information footprint may extend to or match the contour limited footprint. The modulation (externally or internally) of the at least one light source may provide higher data rates in comparison to the spatial light modulator if the spatial light modulator modulates the light of the light trajectory other than spatially.

The apparatus may comprise at least two light sources that provide light at different wavelengths to the light trajectory. Each of the at least two light sources may be configured to modulate the light internally or externally. In this way, the light of the light trajectory may contain light of at least two different wavelengths and/or at least one different modulations schemes. Thus, the light of the light trajectory may provide information to the at least one contour limited footprint. This may form one contour limited information footprint within the at least one contour limited footprint. The contour limited information footprint may be extended to or match the contour limited footprint. In this way, the light of the light trajectory may provide information to at least one receiver within the contour limited information footprint. At least one receiver within the at least contour limited information footprint may receive the information on one wavelength. At least one receiver within the at least one contour limited information footprint may receive information on at least one wavelength.

Instead of at least two light sources with at least two different wavelengths, the at least one light source may be configured to provide light in at least two different polarizations. In this way, at least one receiver within the contour limited footprint may receive information in a polarization sensitive way. The at least two light sources may be configured to provide light in at least two different polarizations and at least one wavelength. The at least two light sources may be configured to provide light in at least two different polarizations and in at least two wavelengths. In this way, the receiver within the contour limited footprint may receive information in a wavelength and/or polarization sensitive way.

This may enable a free space optical communication with an additional illumination. This may enable a covert free space optical communication with additional illumination. The free space optical communication may be a one way optical communication. The information may encode information or messages about airspeed and heading direction. The information may encode encryption keys. This may be used as authentication and/or authorization key. In this way, A can authenticate and/or authorize against B and/or B against A. The encryption key may be used to decrypt or encrypt information that was provided by a communication link other than the configurable light signal. The encryption keys may be used to avoid jamming and/or spoofing of A and/or B from a third party. The configurable light signal/information beacon may be used as a backbone for other communication links. The configurable light signal/information beacon may be used as a side channel communication link next to (an) other communication link(s).

The spatial light modulator may be realized as an electrically-addressed spatial light modulator. The spatial light modulator may be realized as reflexive or transitive electrically-addressed spatial light modulator. In this way, the spatial light modulator can flexibly or dynamically be adapted to change or adapt the light trajectory. The electrically-addressed spatial light modulator may comprise or be configured as a digital mirror device. This ensures a reliable and/or simple implementation. The controller may comprise or be configured as a microcontroller. This ensures a reliable and/or simple implementation. The digital mirror device may be controlled by the microcontroller. The digital micro mirror device may be configured to modulate the light of the light trajectory digitally. The digital micro mirror device may be configured to modulate the light of the light trajectory digitally to achieve amplitude shift keying. In this way, digital control of the digital micro mirror device may provide faster and/or more efficient control.

The lens system may comprise a relay system and a wide angle lens system. In this way, a compact lens system may be provided. The wide angle lens system may be configured to provide a field of view of at least or more than 180°. In this way, a broad search field can be provided by a compact lens system.

The relay system may comprise at least one optical device and/or a single lens and/or at least one mirror. The relay system may comprise devices that can change the polarization.

According to a second aspect, a moving object comprising the apparatus may be provided. The apparatus may be attached or mounted to the moving object. In other words, the moving object may be equipped with the apparatus or may carry the apparatus. The moving object may be a flying object such as an aircraft or a satellite. The moving object may be a non-flying object such as a vessel.

According to a third aspect, a method for providing a configurable light signal is proposed. The method may comprise providing a specific light trajectory. The light trajectory begins at the at least one light source and continues to a spatial light modulator, into a lens system and out of the lens system to a search field. The method further comprises controlling the spatial light modulator and modulating, by the spatial light modulator, the light of the light trajectory spatially. In this way, the apparatus and, more particularly, the spatial light modulator provides at least on contour limited footprint of the light within the search field.

The spatial light modulator may be configured to provide a static alignment of at least one contour limited footprint within the search field with regard to a reference coordinate system even if the at least one apparatus or the object having or carrying the apparatus changes the relative position in space.

The method may further comprise freely readjusting the shape of the contour of at least one contour limited footprint within the search field.

The method may further comprise transmitting information. The information may be transmitted steganographically. As a consequence, inter alia, steganographical communication may be provided without the possibility of unveiling the link itself nor deriving the communication functionality from the external appearance.

Further, a configurable beacon may be provided that enables to address multiple participants in a given traffic situation.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the controller device may be or comprise a processing unit that may be implemented at least partially as a computer, a logical circuit, an FPGA (Field Programmable Gate Array), a processor (for example, a microprocessor, microcontroller (μC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

It is further clear to the person skilled in the art that even if the herein-described details will be described in terms of a method, these details may also be implemented or realized in a suitable device (e.g. the apparatus according to the first aspect or the moving object according to the second aspect), a computer processor or a memory connected to a processor, wherein the memory can be provided with one or more programs that perform the method, when executed by the processor. Further, even if some of the aspects described above have been described in reference to the apparatus according to the first aspect, these aspects may also apply to the method according to the third aspect and vice versa.

These and other aspects of the invention will now be further described, by way of example only, with reference to the accompanying figures, wherein like reference numerals refer to like parts, and in which.

Figure 1:
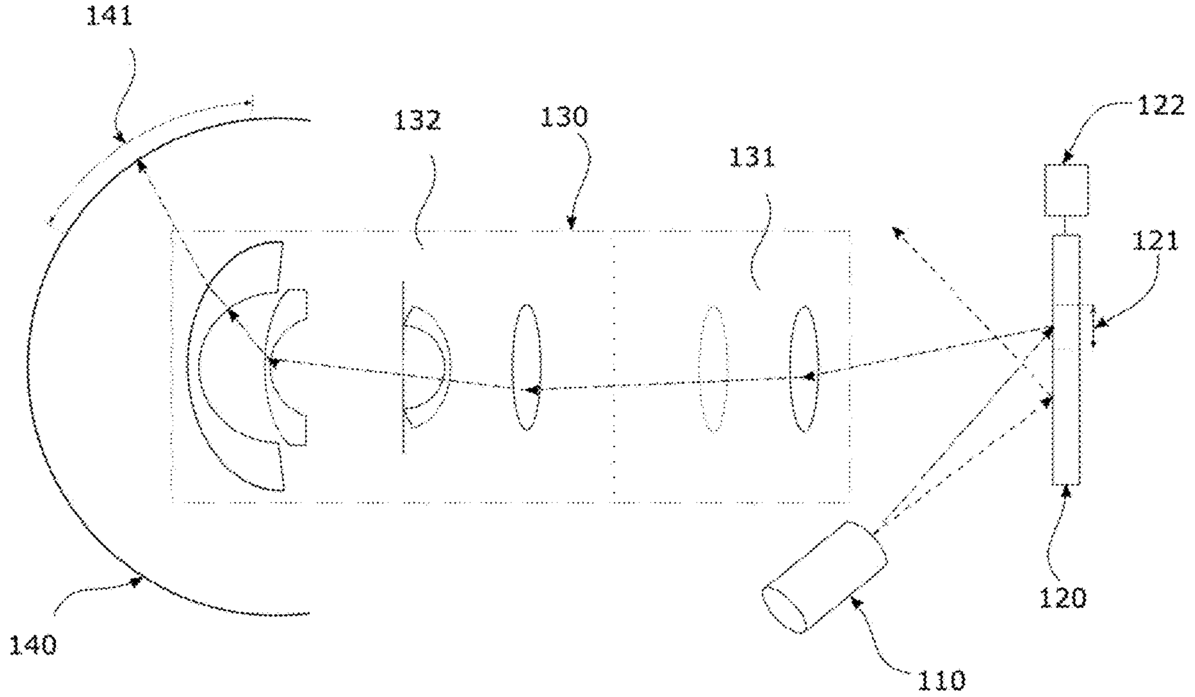
FIG. 1 illustrates an embodiment of an apparatus for providing a configurable light signal.
Figure 2:
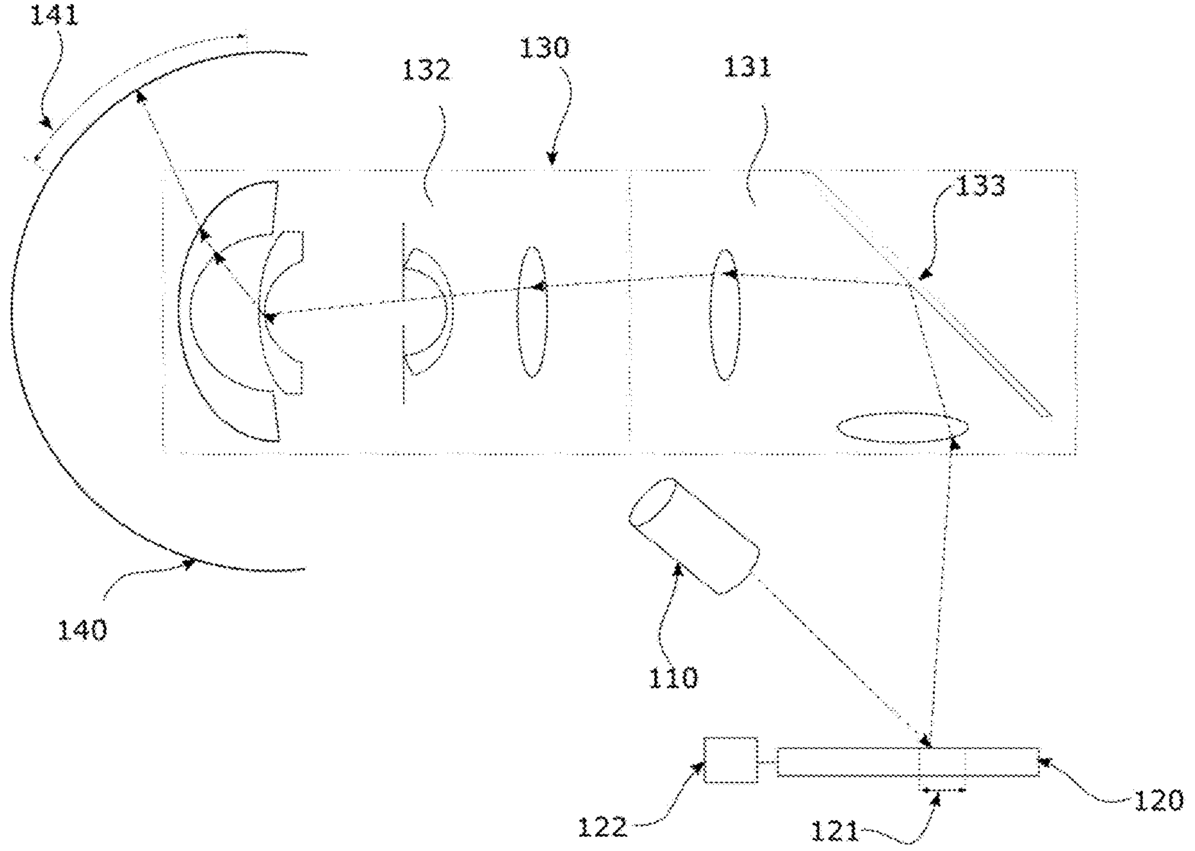
FIG. 2 illustrates a variant of the embodiment of the apparatus of FIG. 1.
Figure 3:
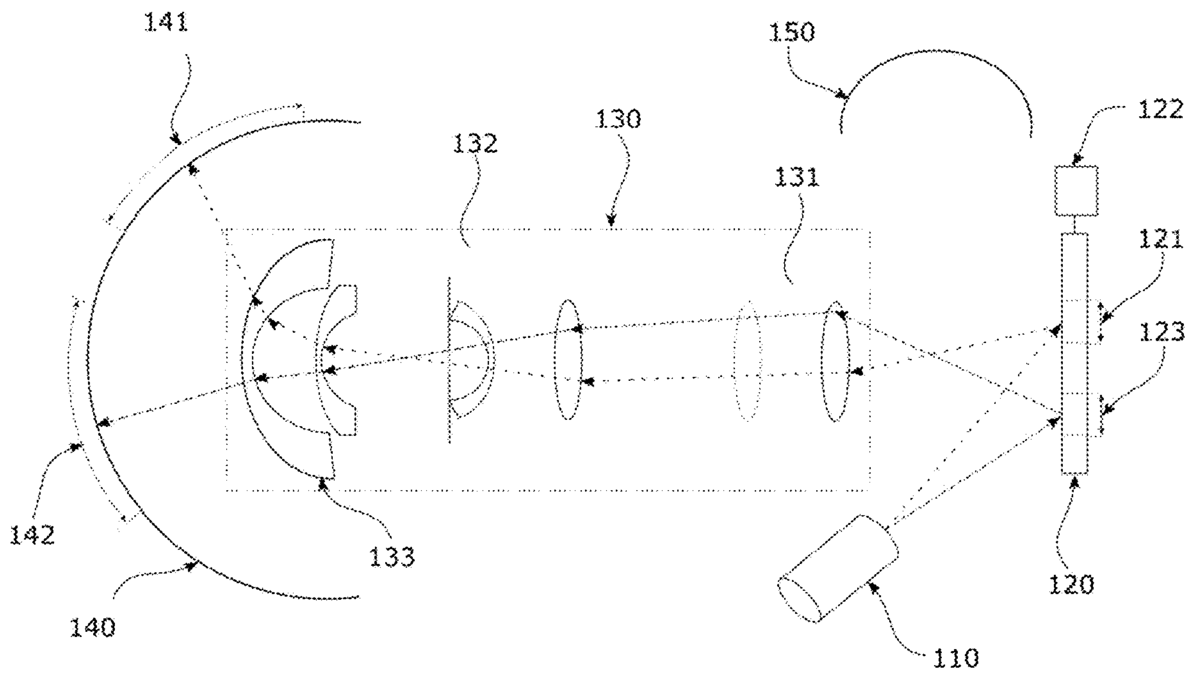
FIG. 3 illustrates a variant of the embodiment of the apparatus of FIG. 1 but with two light sources.
Figure 3A:
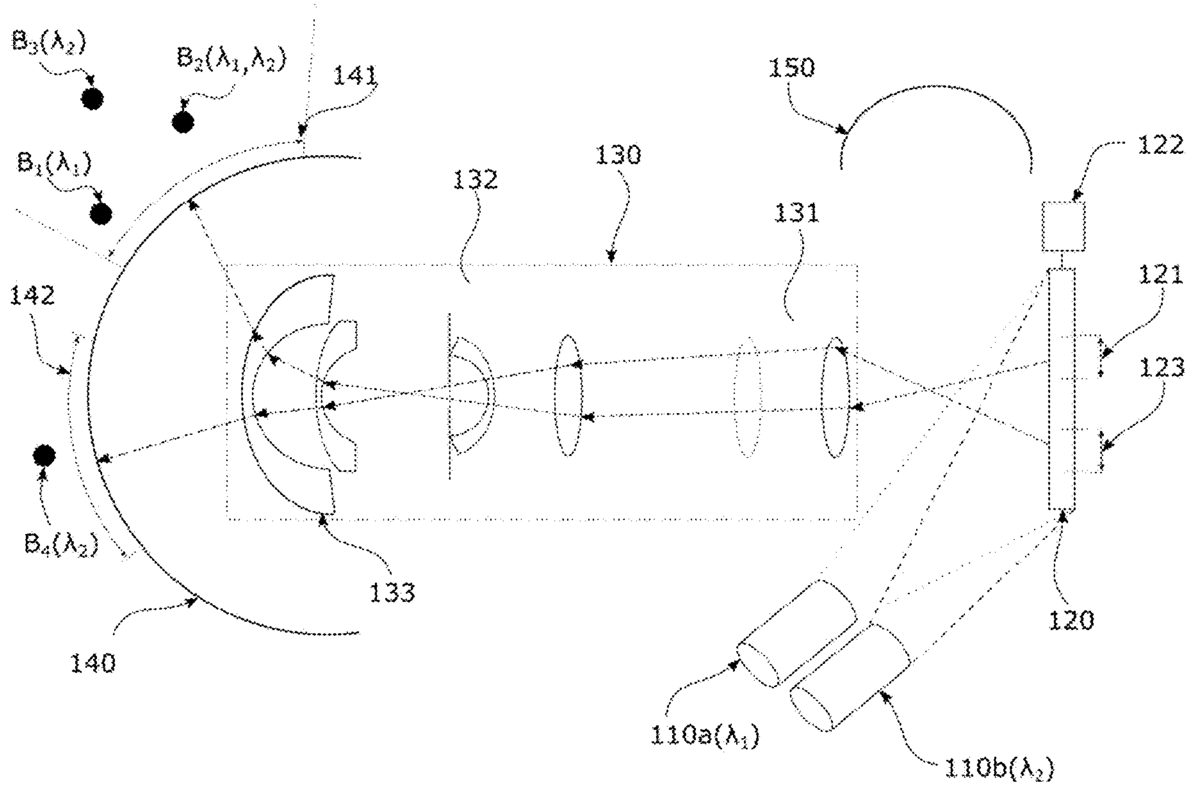
Figure 3B:
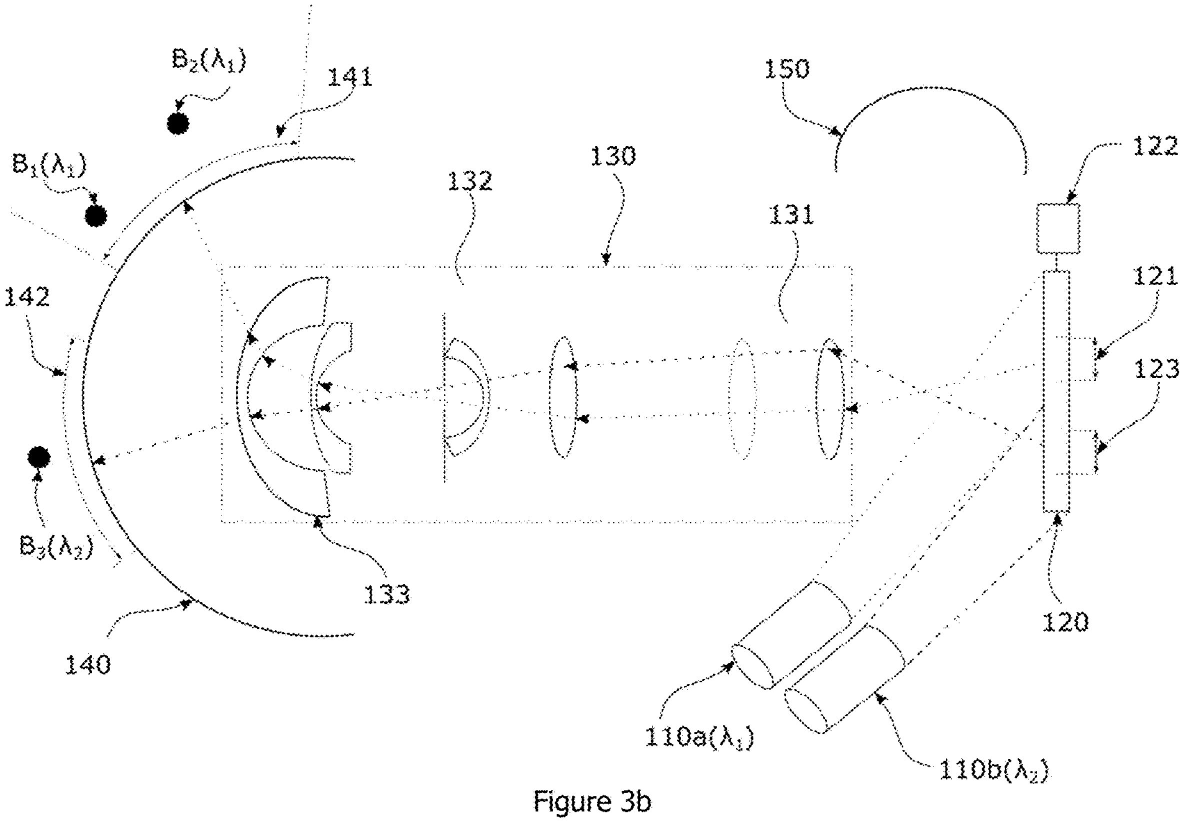
Figure 3C:
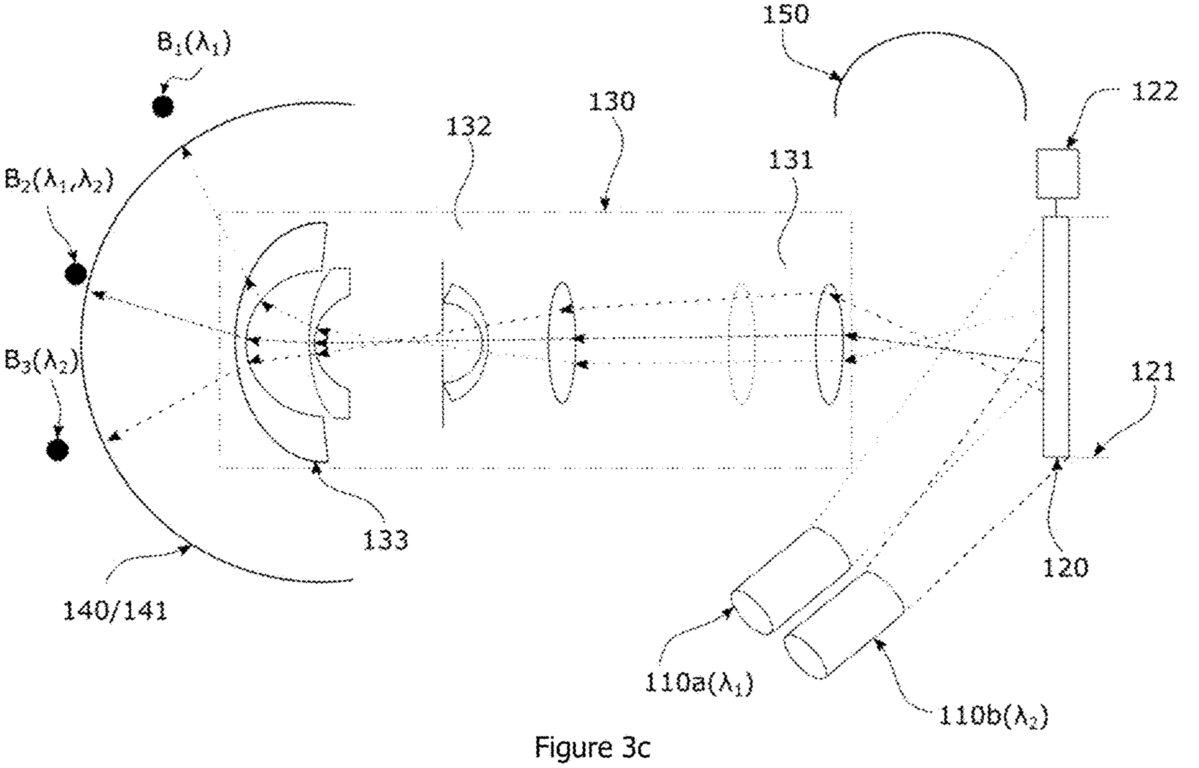
Figure 4:
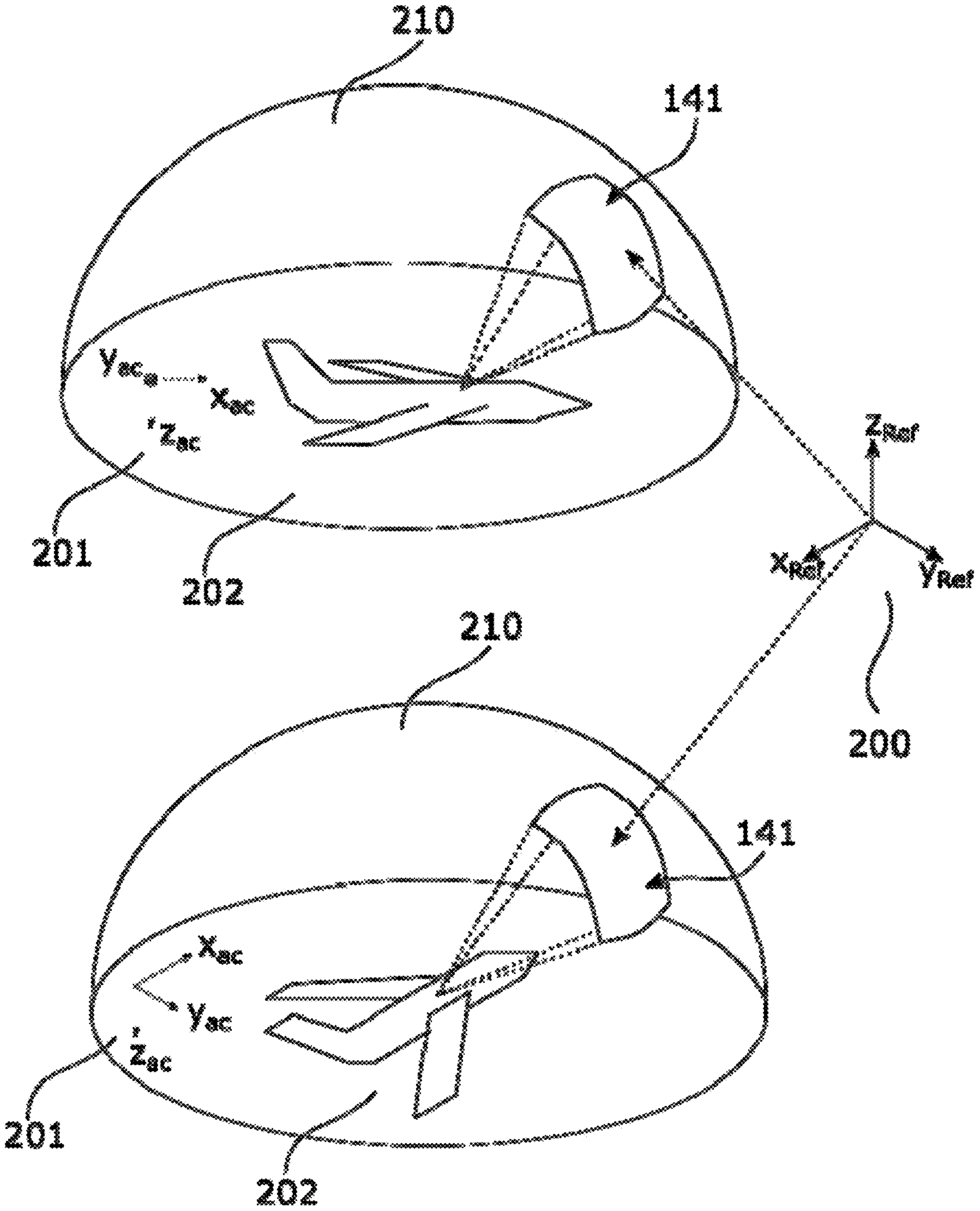
Figure 5:
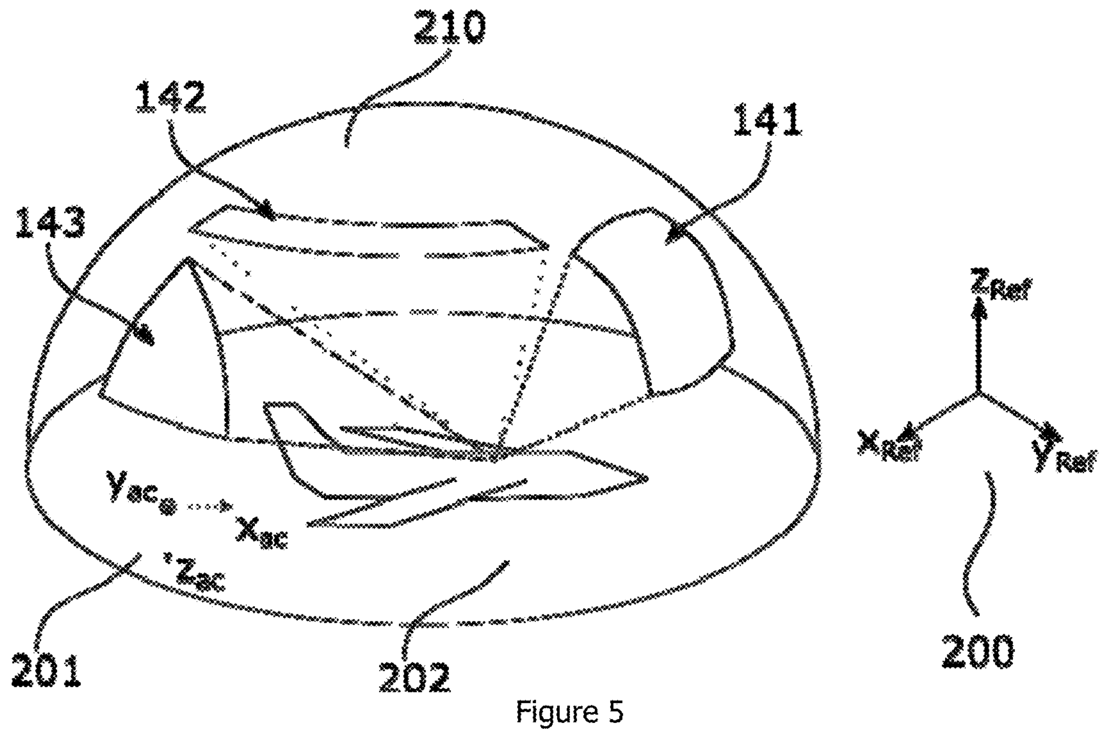
Figure 6:
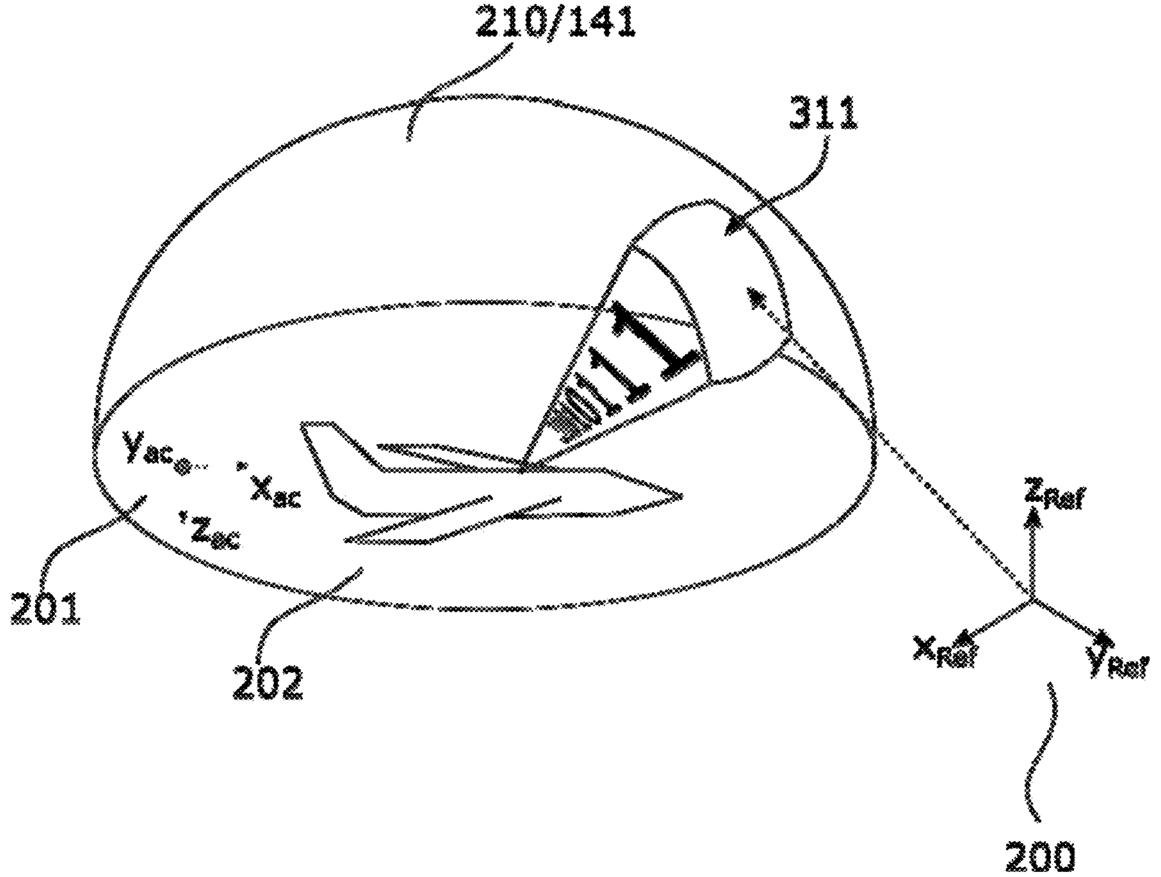

FIG. 3*a* illustrates a variant of the embodiment of the apparatus of FIG. 3;

FIG. 3*b* illustrates a variant of the embodiment of the apparatus of FIG. 3;

FIG. 3*c* illustrates a variant of the embodiment of the apparatus of FIG. 3;

FIG. 4 illustrates an example of an object having the apparatus of any of FIGS. 1 to 3 providing a contour limited footprint within a search field;

FIG. 5 illustrates another example of an object having the apparatus of any of FIGS. 1 to 3 providing a contour limited footprint within the search field;

FIG. 6 illustrates transmission of information within a contour limited information footprint;

FIGS. 7 to 11 illustrate examples of a configurable beacon illuminating a search field.

In the following description, for purposes of explanation and not limitation, specific details are set forth in order to provide a thorough understanding of the present disclosure. It will be apparent to one skilled in the art that the present disclosure may be practiced in other implementations that depart from the specific details. Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also appreciated that when the present disclosure is described as a method, it may also be embodied in a device (e.g., the apparatus and/or moving object described herein below), a computer processor and a memory coupled to a processor, wherein the memory is encoded with one or more programs that perform the method steps disclosed herein when executed by the processor.

FIG. 1 illustrates an example of an apparatus for providing a configurable light signal. The apparatus comprises a light source 110, a spatial light modulator 120 and a lens system 130. Further, a search field 140 is shown in FIG. 1. In this example, the spatial light modulator 120 may be realized as a micro mirror device, by way of example.

The light source 110, the spatial light modulator 120 and the lens system 130 are configured and arranged to provide a light trajectory from the light source 110 to the spatial light modulator 120 into the lens system 130 and out of the lens system 130 to the search field 140. The apparatus further comprises a controller device 122. The controller device 122 is configured to control the spatial light modulator 120. The controller device 122 controls the spatial light modulator 120 so that the spatial light modulator 120 is able to spatially modulate incoming light that follows the light trajectory starting from the light source 110. By modulating the incoming light spatially at the spatial light modulator 120 the light (of the light trajectory) to be reflected by the spatial light modulator 120 can be redirected into the lens system 130 or away from it as indicated by the arrows shown in FIG. 1 by way of example. The light trajectory that is incident on a first portion/area/section 121 of the spatial light modulator section 120 is redirected into the lens system 130. The light trajectory that is incident on portions/areas other than the first portion/area/section 121 of the spatial light modulator 120 is redirected away from the lens system 130. Redirecting may mean or include changing direction by refraction and/or by phase shifting and/or by reflection of light.

The light trajectory can be reflected and/or redirected in a number of different ways. To this end, the spatial light modulator 120 can be implemented in a number of different ways. For example, the spatial light modulator 120 may comprise or be configured as a micro mirror device. In case the spatial light modulator 120 is configured as a micro mirror device, the micro mirror device may comprise a plurality of micro mirrors/micro mirror elements. The plurality of micro mirror elements may be configured to respectively reflect the incident light so as to provide a redirection of the light trajectory. As explained, light of the light trajectory is redirected into the lens system 130 and passes a relay system 131 as well as a wide angle lens system 132. At the wide angle lens system 132 light of the light trajectory is redirected into the search field 140. In consequence, the contour limited footprint 141 results from the projection process through the lens system 130 of the illuminated spatial light modulator section 121. Areas other than the contour limited footprint 141 are not illuminated within the search field 140 by the apparatus. The contour limited footprint 141 can be steered so that it covers a different area within the search field 140. This can be performed by adjusting the section 121 of the spatial light modulator 120. In case of the spatial light modulator 120 comprising or being configured as a digital micro mirror device, this can be done by adapting or changing or adjusting the state of the respective micro mirror elements. The contour limited footprint 141 can vary in size and can vary in shape of the contour. As the spatial light modulator section 121 gets larger, the contour limited footprint 141 gets larger accordingly. The contour of the contour limited footprint 141 can be reshaped as illustrated in FIG. 5 and as will be explained in further detail below. This can be performed by adjusting the section 121 of the spatial light modulator 120. In case of the spatial light modulator 120 comprising or being configured as a digital micro mirror device, this can be done by adapting or changing or adjusting the state of the respective micro mirror elements.

FIG. 2 illustrates a variant of the apparatus of FIG. 1. The variant as shown in FIG. 2 comprises a different lens system 130, i.e. a lens system 130 that is different to the lens system 130 of the apparatus shown in FIG. 1. For example, the variant as shown in FIG. 2 comprises a different relay system 131, i.e. a relay system 131 that is different to the relay system 131 of the apparatus shown in FIG. 1. Other than that, the apparatuses of FIGS. 1 and 2 essentially correspond to each other. According to the variant shown in FIG. 2, the apparatus comprises a relay system 131 with a mirror 133 and two lenses (no reference signs). This arrangement is advantageous if the spatial light modulator 120, the relay system 131 and the wide angle lens system 132 cannot be arranged in a row or can only hardly be arranged in a row. This may be due to the available space at or in aircraft, vessel, satellite or missile to or on which the apparatus shall be attached or arranged. The light trajectory is almost the same as in FIG. 1. However, the light trajectory within the lens system 130 is redirected differently than in FIG. 1. In order to achieve the desired alignment of the contour limited footprint 141 (see below for further details) the controller device 122 may control the spatial light modulator 120. For example, the controller device 122 may control the spatial light modulator to provide a different spatial light modulator section 121, i.e. a spatial light modulator section 121 different to the previous spatial light modulator section 121 from FIG. 1.

FIG. 3 illustrates a variant of the apparatus shown in FIG. 1. In this variant, the apparatus further comprises an absorber 150. Other than that the embodiments shown in FIGS. 1 and 3 are essentially identical. With regard to FIG. 3, an adjusted method is explained, namely a method to provide at least two contour limited footprints 141 and 142 by way of the apparatus shown in FIG. 3. This can be similarly achieved by the apparatuses shown in FIGS. 1 and 2.

The apparatus of FIG. 3 comprises a light source 110, a spatial light modulator 120 and a lens system 130. Further, a search field 140 is shown in FIG. 3. By way of example, the spatial light modulator 120 is realized as a micro mirror device. The light source 110, the spatial light modulator 120 and the lens system 130 are configured and arranged to provide the light trajectory from the light source to the spatial light modulator 120 into the lens system 130 and out of the lens system 130 to the search field 140. The controller device 122 is configured to control the spatial light modulator 120.

In a first step, a light trajectory is provided beginning from the light source 110 to the spatial light modulator 120 into the lens system 130 and out of the lens system 130 to the search field 140. In a second step, the spatial light modulator 120 is controlled by a controller device 122. More particularly, the spatial light modulator 120 is controlled to modulate light of the light trajectory spatially to provide at least one contour limited footprint of the light within the search field 140.

By modulating the incoming light spatially at the spatial light modulator 120 the light (of the light trajectory) to be reflected by the spatial light modulator 120 can be redirected into the lens system 130 or away from it. The light trajectory that is incident on a first portion/area/section 121 of the spatial light modulator section 120 is redirected into the lens system 130. The light trajectory that is incident on a second portion/area/section 123 of the spatial light modulator section 120 is redirected into the lens system 130. The different patterned lines of the two trajectories emphasize the different light sources. The light trajectory that is incident on portions/areas other than the first portion/area/section 121 and the second portion/area/section 123 of the spatial light modulator 120 is redirected away from the lens system 130. The light that is redirected away from the lens system 130 can, for example, at least partially be directed to an absorber 150. The absorber 150 is configured to absorb the light.

The light trajectory can be reflected and/or redirected in a number of different ways. To this end, the spatial light modulator 120 can be implemented in a number of different ways. The spatial light modulator 120 may be configured as a micro mirror device. The micro mirror device may comprise a plurality of micro mirrors elements. The plurality of micro mirror elements may be configured to respectively reflect the incident light so as to provide a redirection of the light trajectory. As explained, light of the light trajectory is redirected into the lens system 130 and passes a relay system 131 as well as a wide angle lens system 132. At the wide angle lens system 132 light of the light trajectory is redirected into the search field 140. In consequence, the contour limited footprint 141 results from the projection process through the lens system 130 of the illuminated spatial light modulator section 121. Further, the contour limited footprint 142 results from the projection process through the lens system 130 of the illuminated spatial light modulator section 123. Areas other than the contour limited footprints 141, 142 are not illuminated within the search field 140 by the apparatus. The contour limited footprints 141, 142 can be steered so that they cover a different area within the search field 140. The steering can be performed by changing or adapting or adjusting the sections 121 and 123, respectively, of the spatial light modulator 120. The contour limited footprints 141, 142 can vary in size and can vary in shape of the contour. As the spatial light modulator sections 121, 123 gets larger, the contour limited footprints 141, 142 get larger, respectively. The contour of the contour limited footprints 141, 142 can be reshaped as illustrated in FIG. 5 and as will be explained in further detail below. The reshaping can be performed by changing or adapting or adjusting the sections 121 and 123, respectively, of the spatial light modulator 120.

Furthermore, the contour limited footprints 141, 142 can be steered so that both contour limited footprints 141, 142 can be merged into one contour limited footprint (not shown), for example. Moreover, at least one of the contour limited footprints 141, 142 can be split up into at least two independent contour limited footprints (not shown) so as to form at least three or more contour limited footprints.

One specific implementation of the apparatus shown in FIG. 3 comprises a fisheye lens 133. In this way, a ray trace plot of a typical fisheye lens can be achieved. To design a configurable beacon, the apparatus may comprise the fisheye lens as a projection lens (not as imaging lens). Further, in this specific implementation, the image may be created by a digital micro mirror device (DMD) as an example for a spatial light modulator 120 and projected onto the hemisphere via the fisheye lens 133. The DMD in turn is illuminated by the light source 110. In order to send a key for identification purposes, the light source could be modulated.

As described, the apparatus of FIG. 3 further comprises a light absorber element 150 by way of example. That is, a potential optical layout of a configurable beacon using a DMD is shown in FIG. 3. The layout uses a light source 110 to illuminate the DMD and a light absorber 150 to prevent unwanted light from exiting the system. The DMD is programmed and/or controlled to reflect the light of pixels that belong to the solid angle so that the light can be directed into the fisheye lens 133. Pixels that do not belong to that solid angle are programmed to reflect the light into the absorber 150.

The light signal may be a beacon signal. Thus, the configurable light signal may be a configurable beacon signal. A beacon is usually an intentionally conspicuous device designed to attract attention to a specific location. A common example is a lighthouse, which draws attention to a fixed point that can be used to navigate around obstacles or into port. More modern examples include a variety of radio beacons that can be read on radio direction finders in all weather, and radar transponders that appear on radar displays. Beacons can also be combined with semaphoric or other indicators to provide important information, such as the status of an airport, by the colour and rotational pattern of its airport beacon, or of pending weather as indicated on a weather beacon mounted at the top of a tall building or similar site. When used in such fashion, beacons can be considered a form of optical telegraphy. Beacons help guide navigators to their destinations. Types of navigational beacons include radar reflectors, radio beacons, sonic and visual signals. Visual beacons range from small, single-pile structures to large lighthouses or light stations and can be located in the air, on land or on water.

Lighted beacons are called lights; unlighted beacons are called daybeacons. Aerodrome beacons are used to indicate locations of airports and helipads. Handheld beacons are also employed in aircraft marshalling, and are used by the marshal to deliver instructions to the crew of aircraft as they move around an active airport, heliport or aircraft carrier.

FIG. 3*a* illustrates an example in which two light sources 110*a*, 110*b* of different wavelengths $\lambda_1$, $\lambda_2$ are used. As an example, four receivers $B_m$ $\lambda_n$ (illustrated as dots) are within the search field 140. Light provided by each light source of the two light sources 110*a*, 110*b* may be modulated externally or internally. In this way, the two light sources 110*a*, 110*b* may provide light to the light trajectory such that the light of the light trajectory contains at least two wavelengths $\lambda_1$, $\lambda_2$ and at least one modulating scheme. This is emphasized by the two dashed lines and the two dotted lines pointing from the two light sources 110*a*, 110*b* to the spatial light modulator 120. There may result different patterns indicating different wavelengths for each of the two light sources 110*a* ($\lambda_1$), 110*b* ($\lambda_2$). The light trajectory points at/to the spatial light modulator 120 and is redirected into the lens system 130 and into/onto the search field 140. In the specific example shown in FIG. 3*a*, the total spatial light modulator area is illuminated by two light sources of two different wavelengths. The illumination area on the spatial light modulator of the at least two light sources 110*a*, 110*b* match each other and both extend as much as to the area of the spatial light modulator 120. The light of the light trajectory redirected by the spatial light modulator contains light of two wavelengths $\lambda_1$, $\lambda_2$. This is indicated by the dashed-dotted lines. The spatial light modulator 120 is configured to modulate light of the light trajectory spatially to provide two contour limited footprints 141, 142 within the search field 140. As the light trajectory contains two wavelengths, each contour limited footprint receives light of two different wavelengths $\lambda_1$, $\lambda_2$. At least one receiver within in the contour limited footprints 141, 142 may receive/experience information on one of the wavelength $\lambda_1$ or $\lambda_2$. At least one of the receivers within the contour limited footprints may receive information on two wavelengths $\lambda_1$ and $\lambda_2$. Different receivers may receive information on different wavelengths. To ensure wavelength sensitive reception, the receiver may be configured to filter the light within the contour limited footprints via filtering to receive information on one wavelength. The filter may be a variable wavelength filter.

Instead of two light sources 110*a*, 110*b* with two different wavelengths $\lambda_1$, $\lambda_2$, the light sources may be configured to provide light in different polarizations. In this way, the receiver within the contour limited footprint may receive information in a polarization sensitive way/manner.

FIG. 3*b* illustrates an example in which two light sources 110*a*, 110*b* of different wavelengths $\lambda_1$, $\lambda_2$ are used. The at least two light sources may be configured to illuminated only a part of the spatial light modulator 120. The spatial light modulator 120 may be illuminated in a way such that the illumination areas for at least two different wavelengths may intersect or may not intersect. In case the illumination areas do not intersect, the contour limited footprints 141, 142 may receive/experience information on one of the at least two wavelengths $\lambda_1$, $\lambda_2$ (as shown in FIG. 3*b*, emphasized with different patterned light trajectories). In other words, the contour limited footprint 141 receives information on wavelength $\lambda_1$ and the contour limited footprint 142 receives information on wavelength $\lambda_2$. As a consequence, the receiver within the contour limited footprints 141, 142 receive information on different wavelengths if the receiver is configured to do so.

FIG. 3*c* illustrates an example in which the illumination areas intersect on the spatial light modulator 120 and no spatial light modulator section is on the Off-State. In order words, all light trajectories that point at/to the area of the spatial light modulator 120 are redirected into the lens system 130. If the illumination areas on the spatial light modulator 120 intersect and all the light trajectories pointing at the spatial light modulator 120 are redirected to the lens system 130, the complete search field 140 is illuminated. In this way, the search field 140 matches the contour limited footprint 141 as indicated in FIG. 3*c*. Further, the search field may divide in areas in which only one of each wavelength is receivable or both wavelengths are receivable. As indicated in FIG. 3*c*, the receiver $B_1$ receives light of the light trajectory that contains light of the wavelength $\lambda_1$. The receiver $B_2$ may receive light of the light trajectory that contains light of the wavelength $\lambda_1$ and $\lambda_2$. The receiver $B_3$ may receive light from the light trajectory that contains light of the wavelength $\lambda_3$.

In view of the foregoing, with reference to FIGS. 4 to 11 it is now assumed by way of example that the light signal is a beacon signal (in short, beacon). Further, by way of example, FIGS. 4 to 11 are explained with reference to an aircraft having or carrying the apparatus. However, other moving objects like satellites, vessels or the like may likewise have or carry the apparatus.

FIG. 4 illustrates static alignment of at least one contour limited footprint within a search field. More particularly, it is shown in FIG. 4 how the at least one contour limited footprint 141 is maintained with regard to the reference coordinate system even if the apparatus changes the/its relative position in space. Both graphics (top and bottom graphic) in FIG. 4 show the spatial representation of the search field 210 that results when the apparatus (e.g. any of the apparatuses shown in FIGS. 1 to 3) is attached on top of an aircraft 202 and moves within the reference coordinate system 200.

The reference coordinate system 200 can be a geographical plane or another plane. In general, the pixel and field of view are configured so that the outer bound of the spatial light modulator 120 is projected into a maximum angle of the field of view of the lens system 130.

In both graphics, the aircraft 202 moves along the $x_{ac}$-axis with respect to the inner coordinate system 201. However, if the aircraft 202 changes the direction to be in the position shown in the lower portion of FIG. 4, the inner coordinate system 201 rotates accordingly and relative to the reference coordinate system 200. However, the apparatus may be configured to consider and/or to anticipate the rotation of the inner coordinate system 201 relative to the reference coordinate system 200. The apparatus may be configured to lock or maintain the relative alignment of the contour limited footprint 141 with regard to the reference coordinate system 200. This is feasible in case of pitching, rolling and/or yawing movements of the aircraft 202. In case of movements of the aircraft 202 and in case the relative alignment is maintained, the spatial light modulator 120 may modulate the light accordingly to ensure the relative alignment of the contour limited footprint 141.

As can be seen in FIG. 4, the search field has the shape of a semi-sphere. In order to provide a full sphere as a search field, a second apparatus can be attached at the bottom of the aircraft 202 facing into the $Z_{ac}$-axis. In this way, a static alignment of the contour limited footprint 141 with respect to the reference coordinate system 200 may be ensured, even if the aircraft 202 performs manoeuvres.

Shadowing effects in the contour limited footprint due to parts of the aircraft, vessel, satellite or missile might be neglected. Such effects may be recognisable in a distance to the apparatus that would violate safety instructions.

As shown in the figures, instead of projecting light onto a flat screen, light is projected onto a hemisphere, for instance by using a fisheye system as a projecting lens as mentioned before. A fisheye such as the fisheye lens 133 is essentially an extreme wideangle imaging lens. To achieve the wide angle, fisheye lenses use projection functions that are different from regular lenses. Most lenses map the tangent of the image angle (i.e. the angle between the axis of the lens and a point in object space) to the radius in the image plane: r=tan (θ), where θ is the image angle, f is the focal length and r is the radius in the image plane corresponding to θ. This is called a gnomonic projection. For large angles θ, r will approach infinity, preventing wide-angle lenses that cover the entire hemisphere. Most fisheye lenses map θ directly to r: r=fθ referred to as an equidistant projection. So if θ approaches 90°, the respective point in object space is still imaged onto the camera's sensor and one can cover the entire hemisphere or even more with a single lens and sensor.

FIG. 5 illustrates an example, in which the spatial light modulator 120 is configured to freely readjust the shape of the contour of at least one contour limited footprint within the search field. In the example of FIG. 5 three contour limited footprints 141, 142, 143 are shown by way of example to illustrate that any number of contour limited footprints with any shape within the search field 210 can be provided by the apparatus. Further, the example of FIG. 5 may provide the possibility of steering the contour limited footprints independently. FIG. 5 illustrates the search field 210 that is referenced to the reference coordinate system 200. The aircraft 202 moves along the $x_{ac}$-axis of the inner coordinate system 201. The controller device 122 is configured to control the spatial light modulator 120. The controller device may control the spatial light modulator such that, by way of example, three different spatial light modulator sections are formed at the spatial light modulator 120. The three spatial light modulator sections respectively redirect the light trajectories into the lens system 130 and consequently into the search field 210. In this way, by way of example, three different contour limited footprints 141, 142, 143 appear within in the search field 210. The contour limited footprints 141, 142 and 143 are, by way of example, differently shaped and cover a different area of the search field 210. Each of the contour limited footprints 141, 142 and 143 is readjustable in shape and/or can be steered independently. This enables the illumination of different areas of the search field 210. The alignment of each, or all, or a group or subset of contour limited footprints 141, 142 and 143 can be maintained with regard to the reference coordinate system 200 or the inner coordinate system 201. The controller device may control the spatial light modulator 120 accordingly.

The spatial light modulator 120 may comprise a plurality of spatial light modulator elements. Each of the elements can be in at least two states, e.g. at least in an on and an off state. Depending on the respective state, the transmittive and/or reflective properties of the respective element may change. In this way, respective one or more sections on the spatial light modulator 120 may be formed that are needed to illuminate respective one or more areas on or within the search field 210.

A spatial light modulator (SLM) is an object that imposes some form of spatially varying modulation on a beam of light. Transparency can be controlled by a computer or controller. Usually, an SLM modulates the intensity of the light beam. However, it is also possible to produce devices that modulate the phase of the beam or both the intensity and the phase simultaneously.

The spatial light modulator 120 may be or comprise an electrically-addressed spatial light modulator (EASLM). The reflective surface of the EASLM is the functional area. As its name implies, the image on an electrically addressed spatial light modulator is created and changed electronically. The spatial light modulator 120 may be or comprise an optically-addressed spatial light modulator (OASLM). The image on an optically addressed spatial light modulator, also known as a light valve, is created and changed by shining light encoded with an image on its front or back surface. The electrically-addressed spatial light modulator may be comprise a reflective or a transitive spatial light modulator.

FIG. 6 illustrates transmission of information, e.g. steganographical transmission of information. The aircraft 202 moves along the $x_{ac}$-axis of the inner coordinate system 201. The spatial light modulator may modulate the light of the light trajectory such that the contour limited footprint can be formed to match the whole search field 210 in alignment and extent. In other words, the apparatus may illuminate any area on the search field lying between non-existent (zero) and the whole search field 210 (, ]0, search field]). In the present case, the contour limited footprint is formed on a portion of the search field. Further, the light that moves along the light trajectory can be modulated in a way other than spatially, so that information can be transmitted within the contour limited footprint 141. In this way, a contour limited information footprint 311 may be formed.

A contour limited information footprint 311 may be at least one area within the contour limited footprint 141 that may experience or receive information. The area of the contour limited information footprint 311 may usually be smaller than the contour limited footprint 141 but can be extended to or match the contour limited footprint 141.

In order to implement the above, several realisations may be used. For example, the spatial light modulator 12 may be configured as a digital mirror device (DMD).

A DMD or DMD chip usually has on its surface a plurality of, e.g. several hundred thousand, microscopic mirrors arranged in a rectangular array which correspond to the pixels in the image to be displayed. The mirrors can be individually rotated, e.g. ±10-12°, to an on or off state. In the on state, light is reflected into the lens system making the pixel appear bright on the search field 210. In the off state, the light is directed elsewhere (e.g. into the absorber), making the pixel appear dark. To produce greyscale, the mirror is toggled on and off very quickly, and the ratio of on time to off time determines the shade produced (binary pulse-width modulation).

Two pairs of electrodes may control the position of the mirror element(s) by electrostatic attraction. Each pair may have one electrode on each side of a hinge, with one of the pairs positioned to act on a yoke and the other acting directly on the mirror element. The majority of the time, equal bias charges are applied to both sides simultaneously. Instead of flipping to a central position as one might expect, this actually holds the mirror element(s) in its current position.

The concept of a configurable beacon presented here is based on a technology that illuminates spatial light modulator such as a DMD, which acts as a pixel matrix to digitally reflect the light falling onto individual micromirrors either into the path for projection or into a light absorber. The image created by the DMD is then projected onto a screen with a lens system.

The digital mirror device may be controlled in a way that all digital mirror elements are turned on so as to reflect light. In this way, light of all light trajectories can be redirected at the digital mirror device into the lens system 130 and into the search field 210. In consequence, the contour limited footprint 141 matches the search field 210. In order to form the contour limited footprint 141 on a portion of the search field, one or more of the mirror elements may be turned off, e.g. by tilting one or more the mirrors of the spatial light modulator into an off position. As a consequence, at least a portion of the light of the light trajectory may be redirected into the lens system 130 and another portion of the light may be tilted away from the lens system 130 such as in the absorber 150. In this way, the footprint 141 shown in FIG. 4 or 5 may be formed.

In addition to the above, the digital mirror device may be controlled by the controller device to apply an amplitude modulation to the incoming light of the light trajectory. This may be achieved by turning one or more of the mirror elements off, e.g. by tilting one or more the mirrors of the spatial light modulator 120 such as the DMD. The switching may be performed repeatedly and/or frequently. This may result in an On-Off-Keying of the light of the light trajectories that point at the frequently redirecting mirror elements. In this way, the contour limited information footprint may experience or receive information (illustrated with a sequence of 1's and 0's in FIG. 6.). The frequency of tilting the micro mirrors exceed advantageously the ability of the human eye to recognize a successive change from an on to off state of the On-Off-Keying.

As explained with respect to FIG. 4 and FIG. 5 the alignment of the contour limited footprint 141 and thus of the contour limited information footprint 311 can be steered, contour reshaped and locked off regarding to the reference coordinate system 200 or to the inner coordinate system 201. Further, it is possible to split the contour limited information footprint 311 into at least two contour limited information footprints that can be steered, shaped independently and experience different information.

Figure 7:
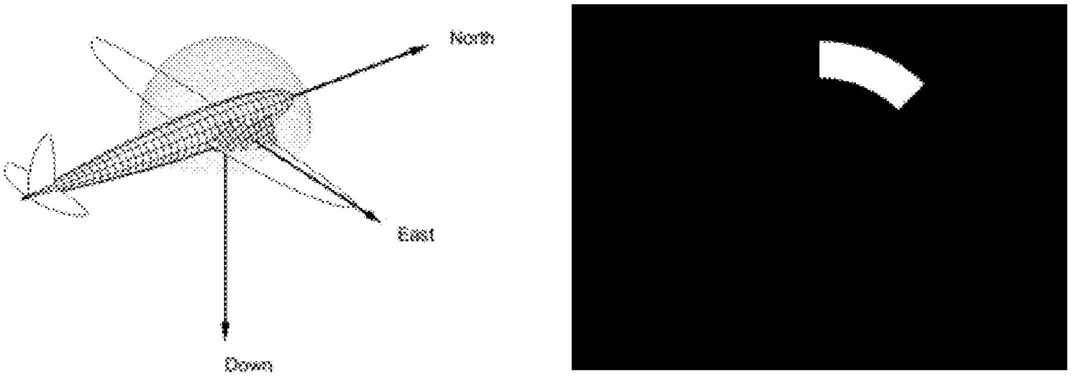
Figure 8:
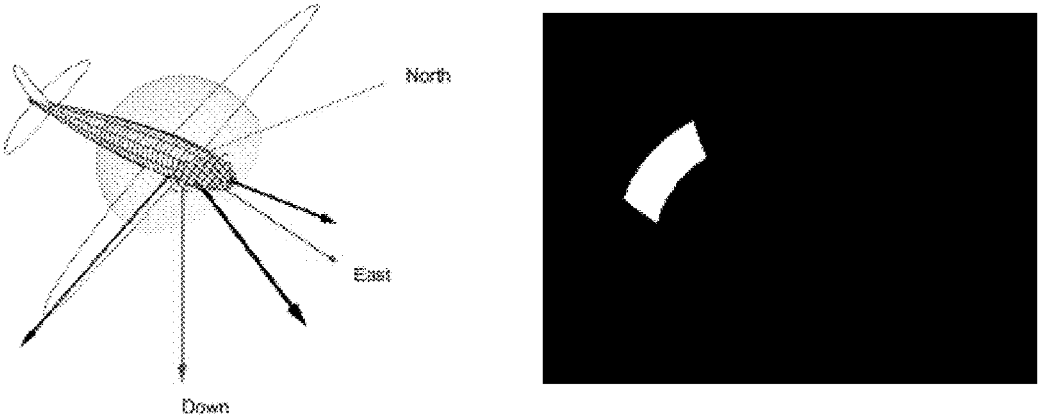
Figure 9:
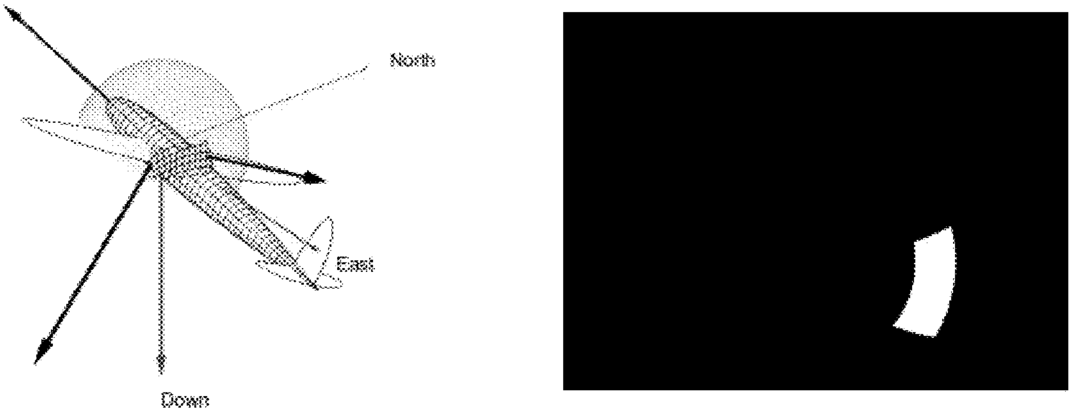
Figure 10:
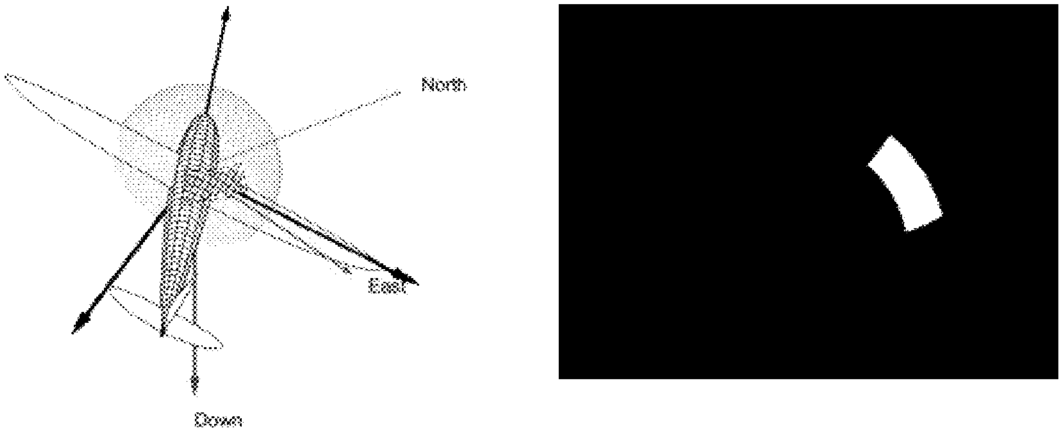

As explained, to determine which DMD pixels need to be "turned on" and which shall be "off", the search field which shall be illuminated by the configurable beacon can be projected onto the image plane of the fisheye system. When operated on an aircraft 202, the search field furthermore can be transformed from geographical coordinates (e.g. an azimuth/elevation mask in North/East/Down coordinates) to the aircraft's reference frame and then to the reference frame of the optical system of the configurable beacon. The results of such a set of transformations are shown in FIG. 7 to FIG. 10. FIG. 7 shows an example of a configurable beacon illuminating a rectangular search field of 90° . . . 135° azimuth and 10° . . . 30° elevation. FIG. 7 shows an aircraft flying straight and level, heading due North. Thus, FIG. 7 shows an aircraft at varying attitudes, while the configurable beacon illuminates a search field that covers an azimuth range from 90° to 135° and an elevation range of 10° to 30° above the horizon. FIG. 8 shows the same search field illuminated as in FIG. 7, aircraft pitched 10° upwards, rolling 30° to starboard and heading towards 90°. FIG. 9 shows the same search field illuminated as in FIG. 7, aircraft pitched 10° upwards, rolling 30° to starboard and heading towards 270°. FIG. 10 shows the same search field illuminated as in FIG. 7, aircraft pitched 10° upwards, rolling 30° to starboard and heading towards 315°.

The geographic North/East/Down (NED) reference frame is also shown together with aircraft axes in thick black. The meshed dome above the aircraft illustrates how the pixels of the DMD are projected onto the sphere; the pixels that are to be turned on to illuminate the search field are marked (each pixel is scaled to 20 times its actual size to make it visible). Since one fisheye lens can only cover slightly more than a hemisphere, two configurable beacons can, for example, be installed on the aircraft. The right side of the figures shows the corresponding images on the DMD that would have to be programmed to achieve the respective illumination. The images are oriented such that the forward direction of the aircraft points to the right and the starboard direction points downwards. Note how the illuminated area on the dome always stays at the same spot with respect to the reference frame, despite the pitching, rolling and yaw motion of the aircraft.

Figure 11:
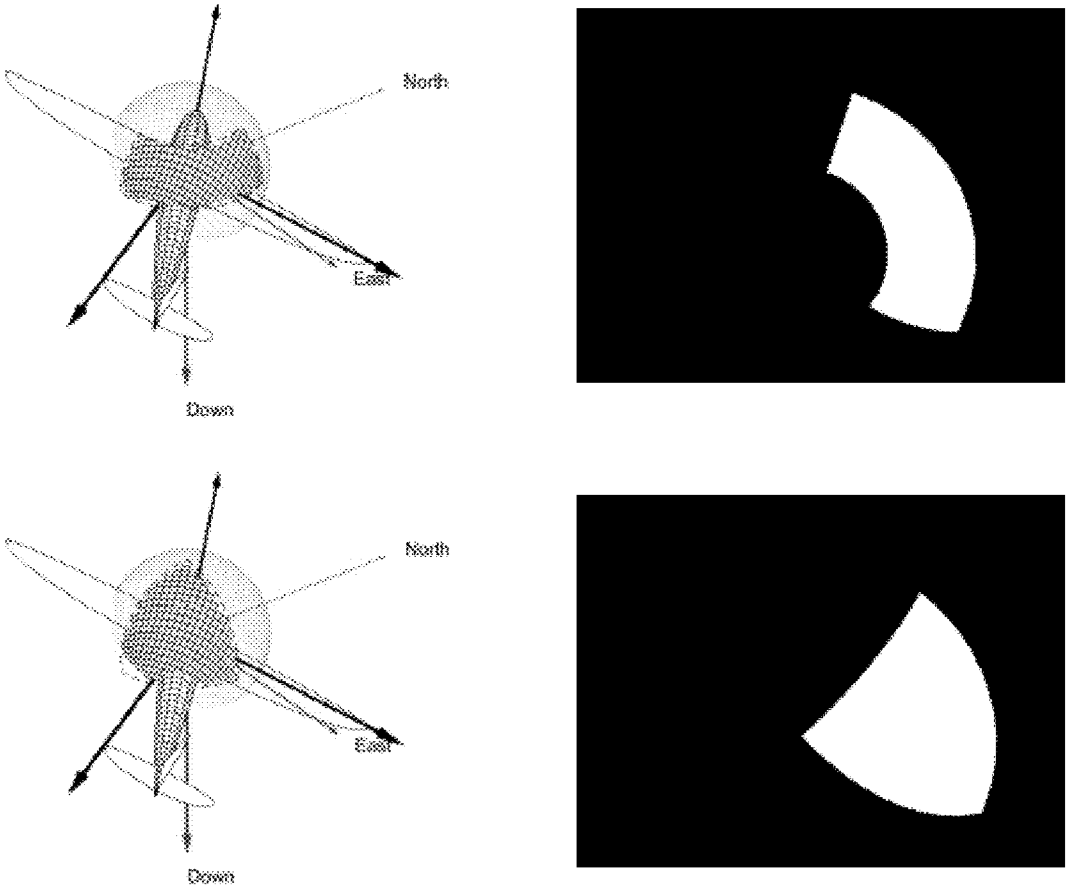

FIG. 11 shows some examples of different search fields programmed into the system. FIG. 11 shows the same aircraft attitude as in FIG. 10, but with different search fields, namely: Top: 60° . . . 180° azimuth and 10° . . . 45° elevation, bottom: 90° . . . 180° azimuth and −10° . . . 90° elevation.

As stated above, to create a configurable beacon, one may for instance use a fisheye lens with a field of view of 200°, giving some overlap to allow for alignment of two beacons. Digital micro mirror devices can be used in varying sizes and video standards. This allows to design the configurable beacon to the system's needs, with respect to resolution and the minimum beacon width that shall be implemented.

The invention claimed is:

1. An apparatus for providing a configurable light signal comprising:

at least one light source, a spatial light modulator, a lens system, and a controller device, wherein the at least one light source, the spatial light modulator and the lens system are configured and arranged to provide a light trajectory beginning from the at least one light source to the spatial light modulator into the lens system and out of the lens system to a search field, wherein the controller device is configured to control the spatial light modulator and the spatial light modulator is configured to modulate the light of the light trajectory spatially to provide at least one contour limited footprint of the light within the search field, wherein the spatial light modulator is configured to manipulate a phase or an amplitude of incoming light of the light trajectory and thereby steganographically transmit information to an area within the at least one contour limited footprint.

2. The apparatus for a configurable light signal of claim 1, wherein the spatial light modulator is configured to modulate the light of the light trajectory spatially such that the at least one contour limited footprint is steerable and/or shapeable within the search field.

3. The apparatus for a configurable light signal of claim 1, wherein the at least one light source is configured to manipulate a phase or an amplitude of the light provided by the at least one light source such that the at least one contour limited footprint experiences information.

4. The apparatus for a configurable light signal of claim 1, wherein the at least one light source is configured as or includes at least two light sources that provide light of at least two different wavelengths that follow the light trajectory to at least one receiver within the at least one contour limited footprint such that the at least one receiver can receive information in a wavelength dependent way.

5. The apparatus for a configurable light signal of claim 1, wherein the spatial light modulator is configured as or comprises an electrically-addressed spatial light modulator.

6. The apparatus for a configurable light signal of claim 5, wherein the electrically-addressed spatial light modulator is configured as or comprises a digital mirror device and the controller device is configured as or comprises a microcontroller.

7. The apparatus for a configurable light signal of claim 6, wherein the digital mirror device is configured to modulate the light of the light trajectory digitally to achieve amplitude shift keying.

8. The apparatus for a configurable light signal of claim 1, wherein the lens system comprises a relay system.

9. The apparatus for a configurable light signal of claim 8, wherein the lens system comprises a wide angle lens system configured to provide a field of view of at least or more than 180 degrees.

10. The apparatus for a configurable light signal of claim 8, wherein the relay system comprises at least one single lens and/or at least one mirror.

11. A moving or static object comprising the apparatus for a configurable light signal of claim 1.

12. A method for providing a configurable light signal, the method comprising:

providing a light trajectory beginning from at least one light source to a spatial light modulator into a lens system and out of the lens system to a search field, controlling, by a controller device, the spatial light modulator, modulating, by the spatial light modulator, light of the light trajectory spatially to provide at least one contour limited footprint of the light within the search field, and manipulating, by the spatial light modulator, a phase or an amplitude of incoming light of the light trajectory to steganographically transmit information to an area within the at least one contour limited footprint.

13. A method for a configurable light signal of claim 12, the method further comprising readjusting a shape of a contour of the at least one contour limited footprint within the search field.

14. A method for a configurable light signal of claim 12, the method further comprising transmitting information using the at least one contour limited footprint.

* * * * *